United States Patent [19]
Wichterle

[11] 3,895,169
[45] July 15, 1975

[54] METHOD FOR PRODUCING A HYDROPHILIC LAYER ON THE SURFACE OF NON-HYDROPHILIC ACRYLIC RESINS

[75] Inventor: Otto Wichterle, Prague, Czechoslovakia

[73] Assignee: Ceskoslovenska akademie ved No. 3 Narodni, Prague, Czechoslovakia

[22] Filed: Oct. 4, 1972

[21] Appl. No.: 294,846

[30] Foreign Application Priority Data
Oct. 8, 1971  Czechoslovakia ............... 7115-71

[52] U.S. Cl. ............... 428/420; 427/400; 427/307; 428/522; 156/2
[51] Int. Cl. ............................................ B44d 1/092
[58] Field of Search ........ 117/118, 47 A, 138.8 UA; 156/2

[56] References Cited
UNITED STATES PATENTS

| | | | |
|---|---|---|---|
| 2,832,698 | 4/1958 | Walles | 117/138.8 UA |
| 3,445,350 | 5/1969 | Klinger | 117/47 A |
| 3,627,558 | 12/1971 | Roger | 117/47 A |
| 3,660,293 | 5/1972 | Macquire et al. | 117/47 A |
| 3,689,303 | 9/1972 | Macquire et al. | 117/47 A |
| 3,698,919 | 10/1972 | Kuzmik | 117/47 A |

*Primary Examiner*—Ralph Husack
*Assistant Examiner*—Janyce A. Bell
*Attorney, Agent, or Firm*—Murray Schaffer

[57] ABSTRACT

A method of forming a hydrophilic layer on the surface of non-hydrophilic acrylic resins which have been shaped or molded into a desired configuration or structure. In carrying out the method, the resin structure is hydrolysed and reesterified with a strong acid and a polyhydroxy organic compound, such as sulfuric acid and ethylene glycol, respectively, and generally at temperatures above at least about 50°C.

9 Claims, No Drawings

METHOD FOR PRODUCING A HYDROPHILIC LAYER ON THE SURFACE OF NON-HYDROPHILIC ACRYLIC RESINS

BACKGROUND OF INVENTION

This invention relates to a method for forming hydrophilic surfaces on non-hydrophilic polymer structures. More particularly, the invention relates to a method for forming hydrophilic surfaces on non-hydrophilic acrylic resinous structures.

For some relatively important applications and uses methacrylic and acrylic plastics require treatment of their surfaces to make them substantially completely wettable by water. Moreover, it is sometimes necessary that to maintain the surfaces in a soft elastic state and swelled to a definite depth when contacted by water. The existing methods for achieving these results consist, generally, in the application to a hard hydrophilic base of one or more new layers which exhibit gradually increasing hydrophilic character. The disadvantage of all the known methods in a relatively sharp transition between the hydrophobic base and the hydrophilic layers and which causes considerable mechanical stresses at the boundary between the base and the layers, as well as between layers, and a danger of the peeling off the added layers. There exists, therefore, a need to provide a method which results in articles that do not exhibit the mentioned disadvantages.

STATEMENT OF INVENTION

According to this invention, the hydrophilic surface layer is formed not by addition of a new layer, but by a chemical conversion of the base. It has been surprisingly found that in spite of the enormous stabililty of ester and nitrile linkages in acrylic polymers and particularly in methacrylic polymers, they can be hydrolyzed and reesterified by the action of strong acids, such as sulfuric acid, sulphoacids, that is, organic sulphonic acids, fluorosulphuric acid, and the like, upon the acrylic or methacrylic polymers. Linear polymeric acids are formed by the present process by conversion of the ester, amide, or nitrile groups to free carboxylic groups, which are, especially in the neutralized form, perfectly soluble in water. The formation of a water swelling but insoluble gel at the modified surface is achieved in the presence of polyfunctional alcohols, which on the one hand introduce neutral ester groups with hydrophilic chains and on the other hand cause cross-linking of the chains and the formation of an insoluble hydrogel concurrently with the hydrolytic conversion.

DESCRIPTION OF PREFERRED EMBODIMENTS

The reaction of acrylic polymers with solutions of glycols, or other compounds containing two or more hydroxyl groups in the molecule, proceeds at various temperatures in a different way. At lower temperatures such as ambient temperature, the swelling of the surface layer takes place. However, chemical conversion of the polymer occurs only to a small degree. An opaque and relatively low hydrophilic layer results after neutralization with dilute hydroxide and washing with water.

On the other hand, if the acrylic polymers are treated with warm solutions of hydroxy compounds in sulfuric acid, a deep chemical conversion proceeds concurrently with the diffusion of the acid into the polymer. This results in conversion of ester, amide, or nitrile groups into carboxylic groups, or on the other hand, in the reesterification by the presence of a hydroxy compound. In which case a transparent hydrophilic layer results which strongly swells in water after neutralization. The layer may be intensively colored by the use of basic dyes, such as methylene blue so that the depth of penetration of the reaction can be accurately determined on slices of the colored samples.

Since the reaction proceeds in an area which is not sharply divided, the transition between the hydrophilic layer and the hydrophobic acrylate is diffusive in this region to the extent of several hundredths of a millimeter. Substantially perfect cohesion of both layers is achieved in this way, in spite of the fundamental differences between both structures, especially in a highly swollen state in water. Moreover, in the event that brutal mechanical damage of the soft swollen layer occurs, the destruction proceeds more readily throughout all of its parts rather than at the transition area with the hydrophobic base.

A wide varitey of polyfunctional hydroxy compounds can be employed in the practice of this invention such as those having two or more primary or secondary alcohol groups, that is, hydroxy groups. The following simple polyhydroxy compounds are illustrative examples: ethylene glycol, trans-butene-2-diol-1,4, p-xylylene glycol, glycerol, pentaerythritol, mannitol and the like. Polyhydroxy compounds which contain also other functional groups also may be used as well, such as, for example diethylene glycol, triethylene glycol, enneaheptitol, glucolactone, mucic acid, trimethylol-α-picoline, saccharose and the like.

The compounds are to be preferred even over compounds with tertiary alcohol functions (e.g., pinecol) having phenolic or enolic hydroxyl groups since the latter have a hydroxyl of low reactivity.

Non-hydrophilic acrylic resins which can be modified by the method of this invention include polymers and copolymers of esters, amides, and nitriles of α, β -unsaturated acids, such as acrylic, methacrylic, chloroacrylic, and similar acids, either pure or with fillers, plastifiers, dyes, and the like added thereto.

Amide groups may be intermediately formed from nitrile groups by the action of strong acids, particularly at elevated temperatures, and are further converted to carboxylic groups. The carboxylic groups formed from the esters, nitriles or amides are converted by the polyhydroxy compounds present under influence of the strong acid into ester groups and the free hydroxyls of the polyhydroxy compound also contribute to the hydrophility of the surface layer. However, a portion of the molecules of polyhydroxy compound is linked with two or more macromolecules, thereby providing cross-linking. Consequently, solubility and washing away of the hydrophilic layer is thus prevented.

The most common and least expensive acid employed in practicing the method of the invention is sulphuric acid. However, any other acid of comparable strength (measured by the Hammett function) may be used, such as sulphonic acids, alkylsulfuric acids, complexes of boron trifluoride with alcohols, perchloric acid and the like.

Hydroxy compounds with more than two hydroxyl groups can be released from their esters directly in the surface of the acrylic resin which is previously swollen with these esters. An advantage of this process resides in the fact that treatment with the heated acid alone can be accomplished and consequently, the bath is useful for a longer period of time.

On the other hand, hot mixtures of strong acids, such as sulfuric acid, with polyhydroxy compounds are not stable and turn dark in a short time due to the decomposition products formed.

A wide variety of esters can be employed in carrying out the practice of this invention to swell the surface of the resinous structure so long as they provide at least two or more hydroxy groups when liberated by the acid. Such esters include glycerol acetates, such as triacetin, cyclic carbonates, such as ethylene carbonate and propylene carbonate and esters of the polyhydroxy compounds set forth above.

The process of the invention is accomplished simply by contacting the polymeric shaped article with the mixture of strong acid and polyhydroxy compound or swelling the shaped article with a suitable ester and then contacting the treated article with the acid.

The article can be contacted with the acid or acid/-polyhydroxy compound mixture by spraying or brushing the compound or immersing the article in the compound, and in any other suitable manner. On the other hand, spraying, immersion or other suitable and convenient means of contact of the shaped article first with a suitable ester and the with acid, can take place.

The length of time of contact can vary depending upon the desired degree of modification of the surface as well as the temperature and agents. Generally, as contact time and temperature increase, the deeper the penetration and thickness of the swollen layer, as well as the hydrophilic character thereof. In general, however, a temperature of at least about 50°C and above and usually in a range of from about 50°C to about 120°C is employed in carrying out the practice of this invention.

In addition, the amount of the reactants employed in carrying out the practice of this invention can also be varied. Generally, however, in a mixture of acid and polyhydroxy organic compound the acid is employed in the mixture in a range of from about 50 to 90 percent by weight, based on the total weight of the mixture and preferably in a range of 75 to 85 percent by weight, the remainder being polyhydroxy compound.

The shaped article can be made by any convenient shape or form by known methods for molding and shaping non-hydrophilic acrylic resin.

THE EXAMPLES

In order to illustrate the invention, the following examples are set forth. In the examples which are illustrative only and not limitative, all parts and percents are by weight unless otherwise stated.

EXAMPLE 1

A tube made of butyl methacrylate polymer crosslinked by copolymerization with 0.3 percent of ethylene dimethacrylate, was immersed for 2 minutes into 100°C mixture of 1 part of ethylene glycol and 9 parts of a concentrated solution of sulfuric acid. After neutralization with a solution of sodium bicarbonate, and washing in water, the thickness of the hydrophilic layer was ascertained by dyeing with methylene blue. It was 110 microns in a dry state and was expanded to 175 microns by equilibrium swelling in water. Such a tube can be used as a blood vessel, body transplant, a somatic organ or the like.

EXAMPLE 2

A hydrophobic poly(methyl methacrylate) body in the form of an artificial heart pump for extracorporal blood circulation was treated in the following manner: the area to be made hydrophilic was coated with triacetin at 50°C for 10 minutes. The body was then heated to 85°C and the treated surface was wetted with 100°C warm concentrated sulfuric acid for 2 minutes. After washing with water and neutralization with a solution of sodium bicarbonate, the surface portion treated in this way was covered with a continuous layer of smooth transparent strongly swollen gel. The area not so treated retained its hydrophobic nature.

EXAMPLE 3

A completed denture was first pretreated by covering all parts, which are to be kept unchanged, that is, with a glassy hard surface by coating it with a layer of low-molecular-weight plastic polyisobutylene. The denture was then immersed into 100°C warm mixture of 80 parts of 95 percent solution of sulfuric acid and 20 parts of anhydrous glycerol. After 150 seconds the denture was rinsed with water, freed from the protective layer and neutralized by soaking in a 1 percent solution of sodium bicarbonate for 10 minutes. A stable soft layer was formed at the surface of the denture where it comes into direct contact with the gums, that is, the surface which had not been covered by the protective layer during treatment.

EXAMPLE 4

Several plates 1.5 × 50 × 50 mm made of polyacrylonitrile were immersed in a mixture of 80 parts of a 95 percent sulfuric acid solution and 20 parts of ethylene glycol at varying temperatures. Hydrophilic surface layers of variable quality were obtained on each of the plates, dependent upon the temperature of the mixture and duration of immersion of the plates. The thickness of the layers was measured on the fracture surface after dyeing with methylene blue. For an exposure time of 5 minutes and at temperatures 50°, 70°, and 110°C, respectively, the thickness of the layer formed on the corresponding plates equilibrated in 0.2% solution of NaHCO$_3$ was 20, 155, and 189 microns, respectively, and in a dry state 20, 100, and 80 microns, respectively. Increasing the temperature of reaction in several additional plates increased not only the thickness of the swollen layer, but also the hydrophilic character of the layer on the corresponding plates. While the hydrophility of a thin layer at 50°C is already sufficient to achieve dyeability, such a layer does not exhibit sufficient swelling. Therefore, a temperature at least of about 50°C is preferred as a limit for application of this method for the particular material and agent, if the formation of the strongly swollen hydrophilic layer is required.

Numerous advantages of the method of this invention will be apparent to those skilled in the art. It is to be understood, therefore, that the invention is not to be limited to the disclosed embodiments, except as defined in the appended claims.

What is claimed:

1. A method for forming a hydrophilic layer on the surfaces of non-hydrophilic acrylic and methacrylic polymer resinous structure having ester, amide or nitrile groups, comprising the steps of contacting said non-hydrophilic acrylic resinous structure with a mixture of a strong acid and a polyhydroxy organic compound at a temperature above at least about 50°C for a period of time sufficient to permit said strong acid to hydrolyticly convert some of the ester, amide or nitrile groups in said resinous structure into carboxylic groups and to permit said polyhydroxy organic compound to partially crosslink, hydrolyze and reesterify said carboxylic groups to swell the surface of said structure and form a hydrophilic surface layer on said structure.

2. A method as defined in claim 1 wherein the temperature is in a range of from about 50°C to about 120°C.

3. A method as defined in claim 1 wherein the resinous structure is contacted and swelled with an ester and the polyhydroxy organic compound is released directly in the resin by contacting the swollen resinous structure with the strong acid.

4. A method as defined in claim 1 wherein the acid is sulfuric acid.

5. A method as defined in claim 1 wherein the polyhydroxy organic compound contains at least two primary or secondary hydroxyl groups.

6. A method as defined in claim 5 wherein the polyhydroxy organic compound is ethylene glycol.

7. A method as defined in claim 1 wherein the polyhydroxy organic compound is anhydrous glycerol.

8. A method as defined in claim 1 wherein the polyhydroxy organic compound is triacetin.

9. A non-hydrophilic acrylic resinous structure having a hydrophilic layer on the surface made according to the process of claim 1.

* * * * *